United States Patent
Jayaraman et al.

(12)

(10) Patent No.: US 12,041,182 B2
(45) Date of Patent: Jul. 16, 2024

(54) NON-REPUTABLE VEHICLE CHANGE HISTORY

(71) Applicant: FORD GLOBAL TECHNOLOGIES, LLC, Dearborn, MI (US)

(72) Inventors: Vijayababu Jayaraman, Novi, MI (US); Jason Michael Miller, Woodhaven, MI (US); Aldi Caushi, Northville, MI (US); Karl Nathan Clark, Belleville, MI (US); John Cardillo, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 232 days.

(21) Appl. No.: 17/717,434

(22) Filed: Apr. 11, 2022

(65) Prior Publication Data

US 2023/0327882 A1    Oct. 12, 2023

(51) Int. Cl.
H04L 9/32     (2006.01)
G06F 8/65     (2018.01)
H04L 12/66    (2006.01)

(52) U.S. Cl.
CPC .............. *H04L 9/3247* (2013.01); *G06F 8/65* (2013.01); *H04L 9/3239* (2013.01); *H04L 12/66* (2013.01)

(58) Field of Classification Search
CPC ....... H04L 9/3247; H04L 9/3239; G06F 8/65; B60R 16/023; G07C 5/00
See application file for complete search history.

(56) References Cited

U.S. PATENT DOCUMENTS

| | | | |
|---|---|---|---|
| 6,839,710 B2 | 1/2005 | Dabbish et al. | |
| 7,010,682 B2 | 3/2006 | Reinold et al. | |
| 7,734,553 B2 | 6/2010 | Shear et al. | |
| 10,726,000 B1* | 7/2020 | Fortney | H04L 9/3239 |
| 10,755,327 B2 | 8/2020 | Nagla et al. | |
| 2020/0073651 A1* | 3/2020 | Rodriguez Bravo | G06F 21/57 |
| 2020/0387367 A1* | 12/2020 | Eklund | H04L 9/0825 |
| 2022/0358221 A1* | 11/2022 | Mondello | H04W 4/44 |

* cited by examiner

*Primary Examiner* — Lesa M Kennedy
(74) *Attorney, Agent, or Firm* — Vichit Chea; Brooks Kushman P.C.

(57) ABSTRACT

Tracking component configuration is provided. A central gateway is in communication with ECUs over one or more vehicle buses. The central gateway generates a first digest of first software updates installed to the ECUs, the first digest including a manifest of changes performed to the ECUs and a first hash of a subset of the first software updates. A signature is embedded into the first digest, the signature including a first digest hash of the first digest. The first digest is maintained to a non-transitory storage of the central gateway as a non-reputable record of the installation of the software updates.

20 Claims, 8 Drawing Sheets

NON-REPUTABLE VEHICLE CHANGE HISTORY

TECHNICAL FIELD

Aspects of the disclosure generally relate to a cryptographic approach to creating and storing component change histories, which may be used for facilitating accountability for component modifications.

BACKGROUND

To update a software version of a component of a vehicle, the vehicle may be driven to a dealership and serviced by a technician. The technician may utilize a system that tracks the individual software levels of every component in the vehicle as well as available software updates. The technician may manually apply the software updates indicated by the system and record any changes back into the system.

Over-the-air (OTA) software updates are a technique by which software of a vehicle may be updated via a wireless connection. Using an embedded modem or other wireless data connection to the vehicle, OTA updates allow software changes on vehicle electronic control units (ECUs) without a service visit.

SUMMARY

In a first illustrative example, a system for tracking component configuration is provided. The system includes ECUs. The system further includes a central gateway, comprising a hardware processor and a non-transitory storage, wherein the central gateway in communication with the ECUs over one or more vehicle buses. The central gateway is programmed to utilize the hardware processor to generate a first digest of first software updates installed to the ECUs. The first digest includes a manifest of changes performed to the ECUs and a first hash of a subset of the first software updates. The central gateway is also programmed to embed a signature of the central gateway into the first digest. The signature includes a first digest hash of the first digest. The central gateway is also programmed to maintain the first digest to the non-transitory storage as a non-reputable record of the installation of the software updates.

In a second illustrative embodiment, a method for tracking component configuration is provided. A central gateway is in communication with ECUs over one or more vehicle buses. The central gateway generates a first digest of first software updates installed to the ECUs, the first digest including a manifest of changes performed to the ECUs and a first hash of a subset of the first software updates. A signature is embedded into the first digest, the signature including a first digest hash of the first digest. The first digest is maintained to a non-transitory storage of the central gateway as a non-reputable record of the installation of the software updates.

In a third illustrative embodiment, a non-transitory computer-readable medium comprises instructions for tracking component configuration that, when executed by one or more processors of the central gateway in communication with ECUs over one or more vehicle buses, cause the central gateway to perform operations including to generate a first digest of first software updates installed to the ECUs, the first digest including a manifest of changes performed to the ECUs and a first hash of a subset of the first software updates, embed a signature of the central gateway into the first digest, the signature including a first digest hash of the first digest, and maintain the first digest to the non-transitory storage as a non-reputable record of the installation of the software updates.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present approach.

Vehicle software and configurations may be modifiable with tools, without any accountability of who, when and what modification performed. With autonomous and semi-autonomous vehicle capabilities, incorrect or malicious modifications may cause vehicle performance or reliability issues. Thus, it may be desirable that the vehicle maintains a cryptographically protected vehicle change history in a non-reputable form. The non-reputable change history may include chained records of the updates that are performed, as well as by whom they were performed. This history may be readable and extractable from the vehicle gateway module. By using cryptographic keys, the history may be authenticatable for forensic purposes. Further aspects of the disclosure are discussed in detail herein.

Figure 1:
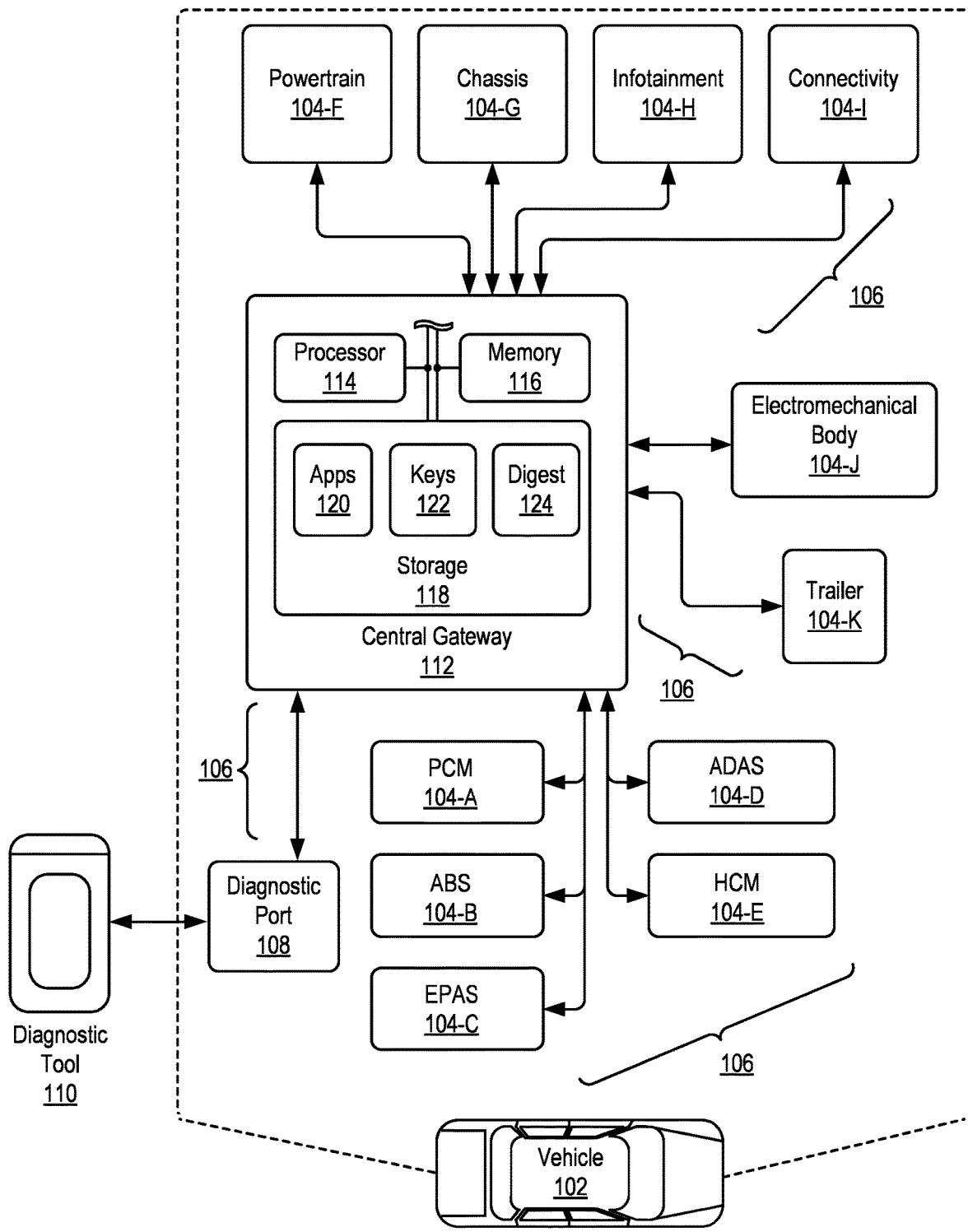
FIG. 1 illustrates an example system including a central gateway configured for use in tracking a non-reputable vehicle change history.

FIG. 1 illustrates an example system 100 including a central gateway 112 configured for use in creation of a non-reputable record of updates to a vehicle 102. The central gateway 112 may be connected to a plurality of ECUs 104 over one or more vehicle buses 106. The central gateway 112 may also include a diagnostic port 108 to which a diagnostic tool 110 may be connected. The central gateway 112 may include a processor 114, a memory 116, and a storage medium 118 for applications and/or data. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors. In another example, the vehicle 102 may be a pure electric vehicle driven by electric motors only.

The vehicle 102 may include a plurality of ECUs 104 configured to perform and manage various vehicle 102 functions under the power of the vehicle battery and/or drivetrain. As depicted, the example vehicle ECUs 104 are represented as discrete ECUs 104-A through 104-H. However, the vehicle ECUs 104 may share physical hardware, firmware, and/or software, such that the functionality from multiple ECUs 104 may be integrated into a single ECU 104 or distributed across a plurality of ECUs 104. The vehicle ECUs 104 may include various vehicle 102 components configured to receive updates of associated software, firmware, or configuration settings.

As some non-limiting vehicle ECUs 104 examples: a powertrain control module (PCM) 104-A may be configured to control engine and transmission components; an antilock brake system (ABS) 104-B controller configured to control brake and traction control components; an electric power-assisted steering (EPAS) 104-C controller configured to control steering assistance and adjust pull or drift compensation functions; advanced driver assistance systems (ADAS) 104-D such as adaptive cruise control or automate braking; and a headlamp control module (HCM) 104-E configured to control light on/off settings. The ECUs 104 may also include other powertrain 104-F or chassis 104-G components, an infotainment system 104-H configured to support voice command and BLUETOOTH interfaces with the driver and driver carry-on devices (e.g., the SYNC system provided by Ford Motor Company of Dearborn, MI), a connectivity controller 104-I such as a telematics control unit (TCU) configured to utilize an embedded modem to access networked devices external to the vehicle 102, electromechanical body controllers 104-J such as window or lock actuators, and trailer controller 104-K components such as light control and sensor data to support connected trailers.

The vehicle bus 106 may include various methods of communication available between the vehicle ECUs 104. The vehicle bus 106 may also support communication between the central gateway 112 and the vehicle ECUs 104. As some non-limiting examples, the vehicle bus 106 may be a vehicle controller area network (CAN), an Ethernet network, or a media oriented system transfer (MOST) network. The CAN network or networks may be various types, including, but not limited to, high speed CAN (HS-CAN) having a data capacity of up to 500 kbps, mid-speed CAN (MS-CAN) having a data capacity of up to 125 kbps, and/or CAN flexible data rate (FD-CAN) having a data capacity of up to 2000 kbps or higher. It should be noted that the illustrated bus topology is merely an example, and other numbers and arrangements of vehicle buses 106 may be used. These vehicle buses 106 may be implemented as a series of segments of wiring. For instance, a vehicle bus 106 may include a plurality of segments of wiring from the central gateway 112 to an end location.

The vehicle 102 may further include a diagnostic port 108 that may be used by external devices to monitor the status of the vehicle 102. In an example, the diagnostic port 108 may be an on-board diagnostics (OBD) port connected to the vehicle bus 106. A user may connect a dongle, code reader, scan device or other diagnostic tool 110 to the diagnostic port 108 and may use the connection provided by the diagnostic port 108 to gain access to messages traversing the vehicle bus 106. The diagnostic tool 110 may include one or more processors configured to execute computer instructions, and a storage medium on which the computer-executable instructions and/or data may be maintained. The diagnostic tool 110 may be any of various types of portable computing device configured to read information from the vehicle 102 and write information to the vehicle 102. In many examples the diagnostic tool 110 may be a dedicated handheld vehicle bus scan tool. In other examples, the diagnostic tool 110 may include a dongle configured to communicate with a cellular phone, tablet computer, smart watch, laptop computer, or other device having processing and communications capabilities. Once connected, a user may utilize the connected diagnostic tool 110 to capture diagnostic codes, monitor vehicle health, provide software updates to the ECUs 104, and/or make adjustments vehicle settings. Similar to the speed of HS-CAN, the CAN diagnostic ports 108 may support data capacity of up to 500 kbps.

The central gateway 112 may be configured to provide an electrical interface between the vehicle buses 106 used to communicate within the vehicle 102. In an example, the central gateway 112 may be configured to translate signals and commands between CAN and/or in-vehicle Ethernet vehicle buses 106 connected to the central gateway 112. For instance, the central gateway 112 may support connection to up to ten CAN vehicle buses 106 and up to seven Ethernet vehicle buses 106. By supporting Ethernet in addition to CAN, the central gateway 112 may be able to provide support for higher-speed in-vehicle network communication, while still performing existing or legacy gateway functions within the vehicle 102.

As a specific non-limiting example, the central gateway 112 may be connected to the powertrain 104-F components over a HS-CAN vehicle bus 106; to the chassis 104-G components, safety systems and a cluster over a second HS-CAN vehicle bus 106; to the infotainment system 104-H over a third HS-CAN vehicle bus 106; to the connectivity controller 104-I and Ethernet security backup systems over a fourth HS-CAN vehicle bus 106; to the electromechanical body controllers 104-J over a first MS-CAN bus; to the trailer controller 104-K and/or nodes readily accessed from the exterior of the vehicle 102 over a second MS-CAN vehicle bus 106; to a diagnostic port 108 over first and second diagnostic data vehicle bus 106 connections; to the PCM 104-A, ABS 104-B, EPAS 104-C, and other controllers over a first FD-CAN vehicle bus 106; and to the ADAS 104-D, HCM 104-E and other controllers over a second FD-CAN vehicle bus 106. For instance, the infotainment system 104-H, connectivity controller 104-I, cluster 104-L, heads-up display 104-M, and ADAS 104-D are each connected to the central gateway 112 via separate 2-wire 100 Mbsp Ethernet vehicle buses 106. In yet another example the heads-up display 104-M may be integrated with the cluster 104-L.

The central gateway 112 may be further configured to provide computing functionality in support of the domain CAN messaging of the vehicle 102. For instance, the central gateway 112 may include one or more processors 114 configured to perform instructions, commands, and other routines in support of the processes described herein. In an example, the central gateway 112 may be configured to execute instructions of applications 120 loaded to a memory 116 of the central gateway 112 from a storage medium 118 of the central gateway 112. The applications 120 may include software code programmed to support the operation of the central gateway 112 discussed in detail herein.

For instance, the applications 120 may include software code to facilitate the creation of a non-reputable record of updates to the vehicle 102, as discussed in detail herein. The computer-readable storage medium 118 (also referred to as a processor-readable medium or storage) includes any non-transitory medium (e.g., a tangible medium) that participates in providing instructions or other data that may be read by the processor 114 of the central gateway 112. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL). As one specific example, the central gateway 112 may be provisioned with at least 128 megabytes of random-access memory (RAM), as well as 2-4 cores of processor 114 for processing power to enable various computing tasks.

The storage medium 118 may maintain a digest 124. The digest 124 may include a record of the updates that were performed to the vehicle 102 using the diagnostic tool 110. The storage medium 118 may also maintain encryption keys 122 for use in authentication and non-repudiation. These aspects are explained in further detail in FIGS. 2-8.

Figure 2:
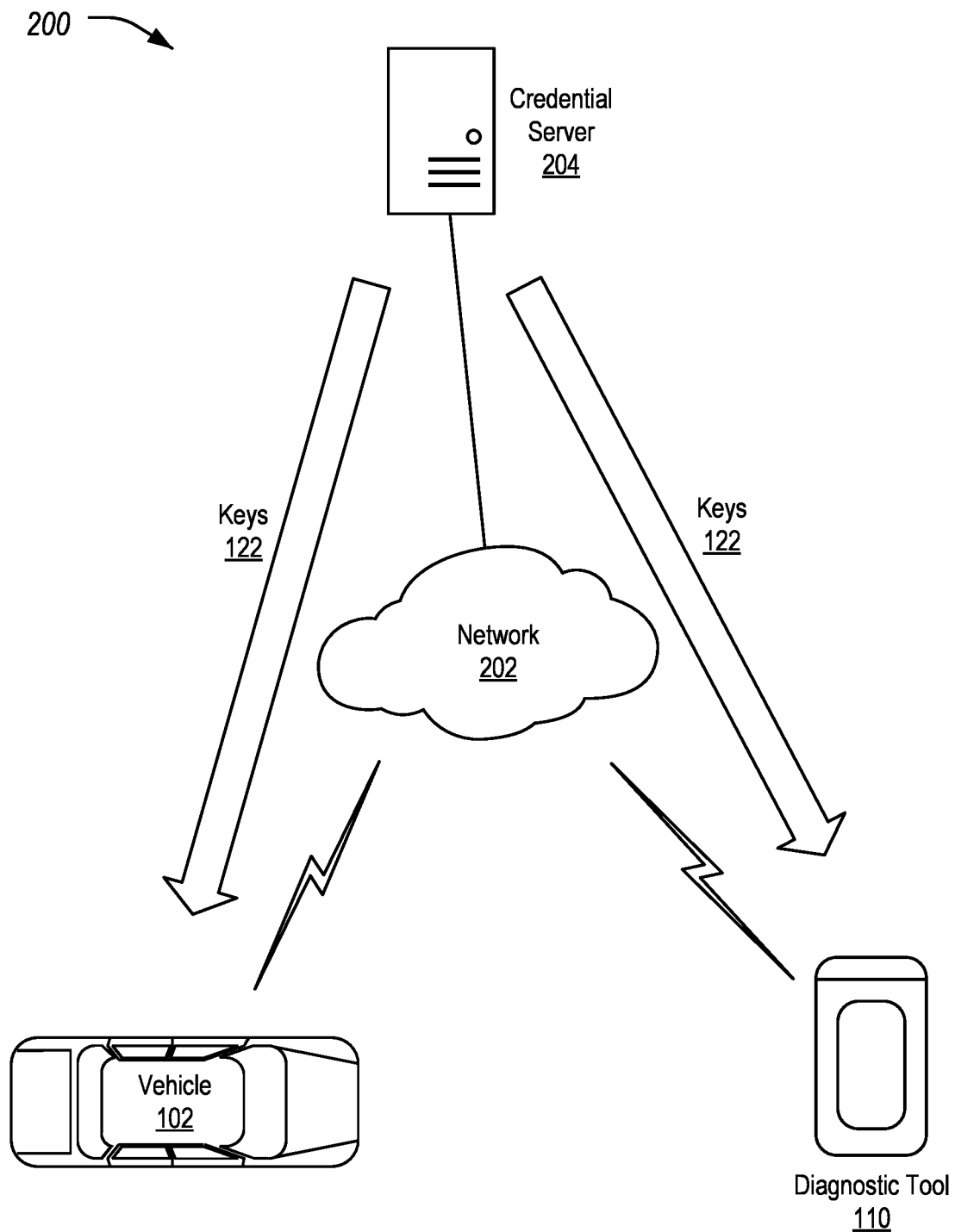
FIG. 2 illustrates an example system for utilizing the vehicle and diagnostic tool to create a non-reputable vehicle change history.

FIG. 2 illustrates an example system 200 for utilizing the vehicle 102 and the diagnostic tool 110 to create a non-reputable vehicle change history. In an example, a public key infrastructure (PKI) may be used to create, manage, distribute, use, store, and revoke keys 122 to manage public-key encryption. PKI is an arrangement that binds public keys with respective identities of entities (such as the diagnostic tool 110 and vehicle 102 in this example). The binding may be established through a process of registration and issuance of certificates at and by a certificate authority (CA). As shown, a credential server 204 may issue a key 122 to both the vehicle 102 and to the diagnostic tool 110. These keys 122 may include public and private key pairs for the diagnostic tool 110 and the central gateway 112 of the vehicle 102. The public key may have an embedded certificate chained to issuing CA, which in one example may be the original equipment manufacturer (OEM) of the vehicle 102.

The vehicle 102 and the diagnostic tool 110 may receive the keys 122 over a communications network 202. For instance, the vehicle 102 may receive private and public keys corresponding to the vehicle 102, while the diagnostic tool 110 may receive private and public keys corresponding to the diagnostic tool 110. The public keys may be shareable among the devices, but the private keys may be kept secret by the respective devices and not be handed out. To receive the keys 122, the diagnostic tool 110 may include various wired or wireless transceivers for communication over the communications network 202. In another example the connectivity controller 104-I of the vehicle 102 may receive the keys 122 and provide the keys 122 over a vehicle bus 106 to the central gateway 112. The communications network 202 may include one or more interconnected communication networks such as the Internet, a cable television distribution network, a satellite link network, a local area network, and a telephone network, as some non-limiting examples.

Figure 3:
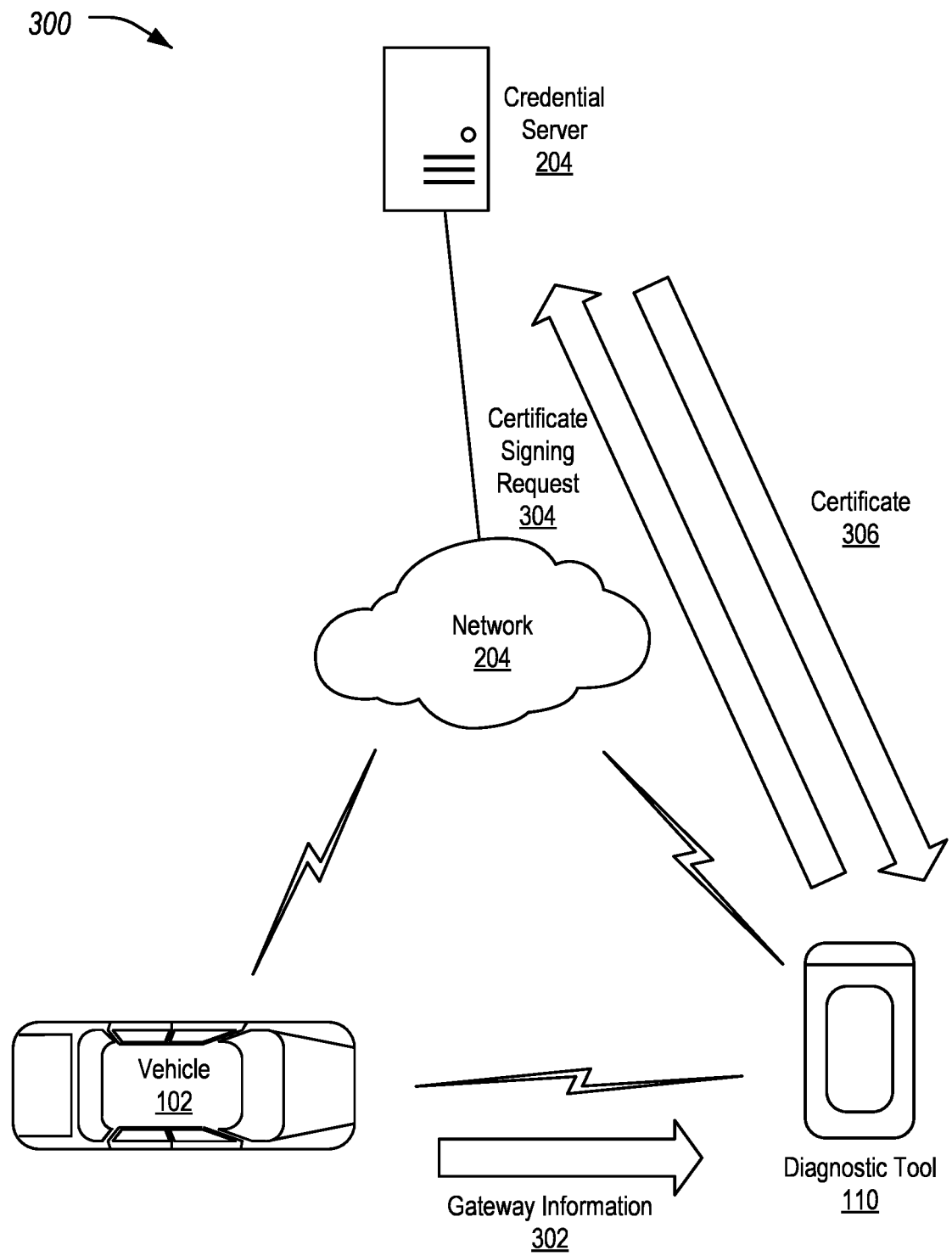
FIG. 3 illustrates an example of the diagnostic tool initiating a software update to the vehicle.

FIG. 3 illustrates an example of the diagnostic tool 110 initiating a software update to the vehicle 102. To do so, the diagnostic tool 110 may be connected to the vehicle 102 via the diagnostic port 108 (the port is not shown in FIG. 3). Responsive to initiation of the diagnostic tool 110 being used to modify vehicle software and/or configuration, the diagnostic tool 110 reads who is using diagnostic tool 110 (e.g., from the keys 122 stored to the diagnostic tool 110). Also responsive to initiation, the diagnostic tool 110 receives gateway information 302 from the vehicle 102. This may include, for example, a serial number of the central gateway 112 of the vehicle 102 to which the diagnostic tool 110 is connected.

Using the captured key 122 and gateway information 302, the diagnostic tool 110 may send a certificate signing request 304 to the credential server 204. This certificate signing request 304 may be forwarded to a registration authority (RA). The RA may forward the certificate signing request 304 to the PKI, which accordingly issues a certificate 306. This certificate 306 may then be provided from the credential server 204 back to the diagnostic tool 110. (While not shown, if the keys 122 or the identity of the diagnostic tool 110 is determined to be invalid or to otherwise lack access, in those circumstances the certificate 306 may not be issued and the update of the vehicle 102 may fail.)

Figure 4:
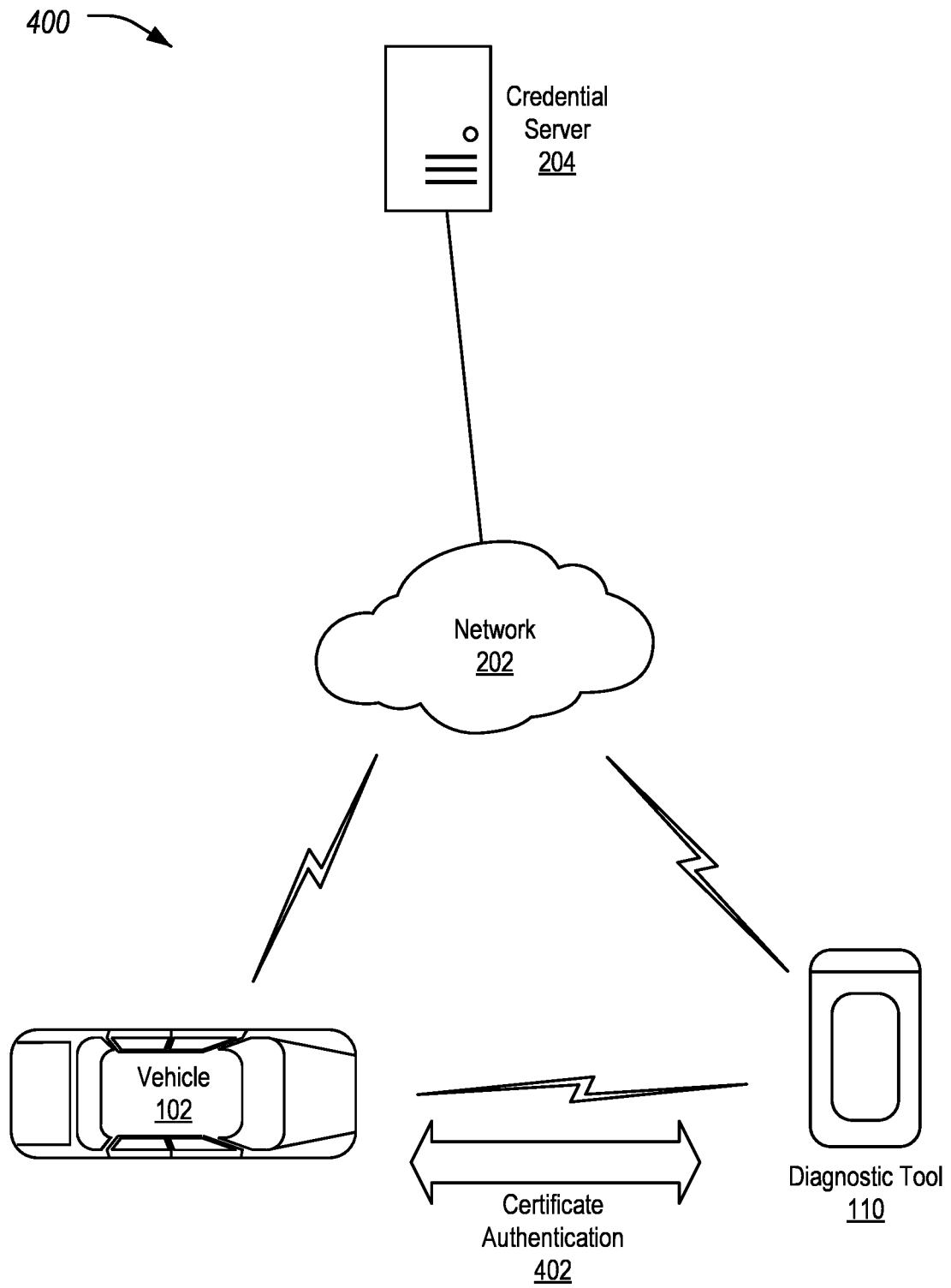
FIG. 4 illustrates an example of the diagnostic tool authenticating with the central gateway using the certificate.

FIG. 4 illustrates an example of the diagnostic tool 110 authenticating with the central gateway 112 using the certificate 306. In an example, the central gateway 112 may confirm that the identity of the diagnostic tool 110, pursuant to the certificate 306 received from the credential server 204, is an identity that has access to update the vehicle 102. In another example, the central gateway 112 may challenge the diagnostic tool 110 to perform a cryptographic task (e.g., signing of information not known to the diagnostic tool 110 ahead of time) to make sure that the diagnostic tool 110 possess the private key 122 corresponding to the public identity of the diagnostic tool 110 indicates by the public key 122 of the diagnostic tool 110.

Figure 5:
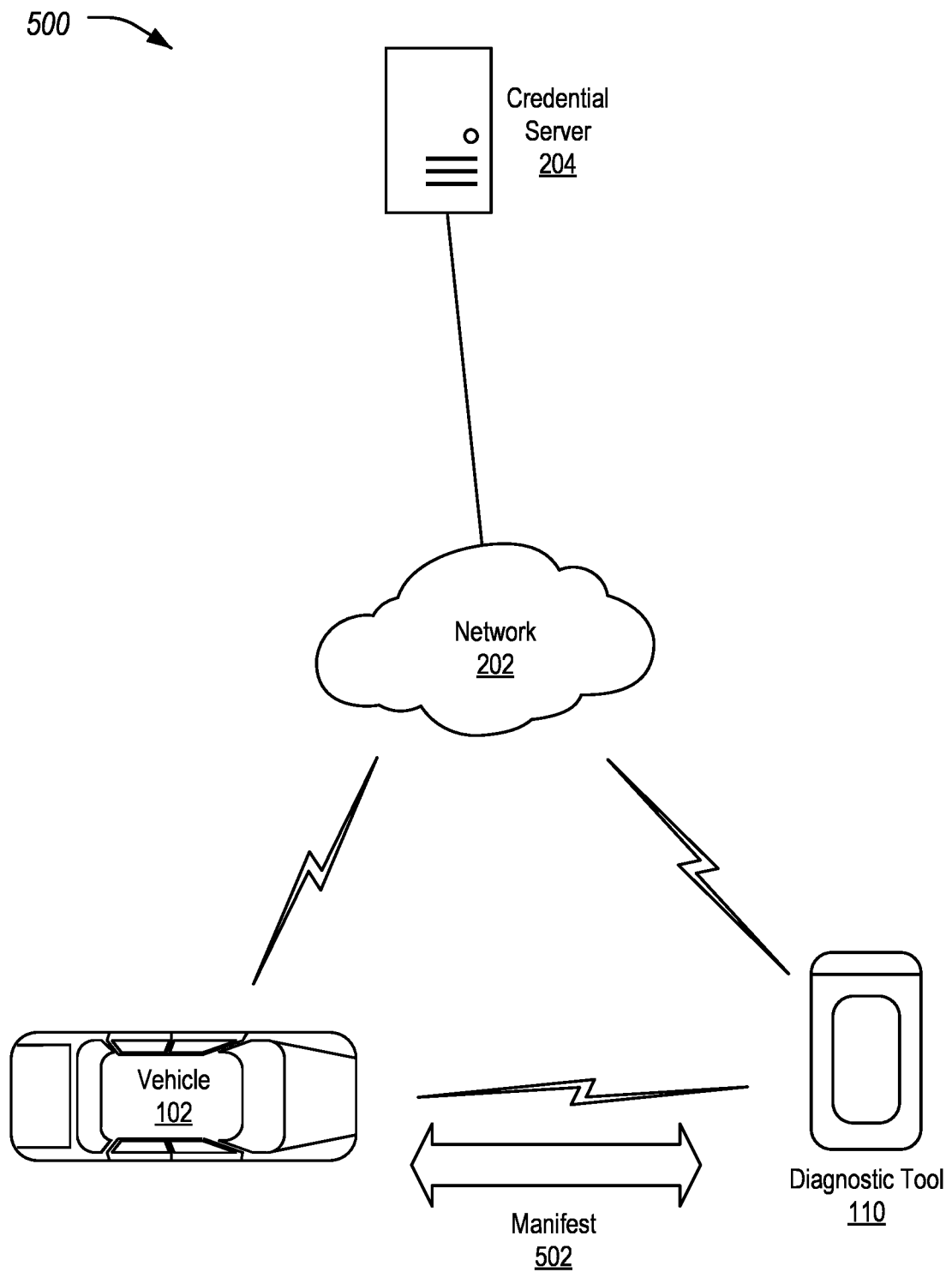
FIG. 5 illustrates an example of the diagnostic tool confirming the scope of the diagnostic session with the central gateway.

FIG. 5 illustrates an example of the diagnostic tool 110 confirming the scope of the diagnostic session with the central gateway 112. To do so, the diagnostic tool 110 may utilize its private key 122 to sign a manifest 502. The manifest 502 may include details of changes intended to be completed during the diagnostic session. These changes may include as some examples, updated settings to be applied to one or more ECUs 104 of the vehicle 102 and/or updated software to be installed to one or more ECUs 104 of the vehicle 102. In an example, the manifest may include metadata of the updates and/or settings to be installed along with a hash of the updates and/or settings to be installed. This metadata may include, for example, names of the updates to be installed, versions of the updates to be installed, build numbers of the updates to be installed, file dates of the updates to be installed. The hash (as well as other hashes discussed herein) may be computing using any of various cryptographic one-way hash algorithms, such as MD5, SHA, RIPEMD, Whirlpool, BLAKE, etc.

In some examples, the diagnostic tool 110 may sign the manifest 502 and send the manifest 502, as signed, to the central gateway 112 of the vehicle 102. For instance, the diagnostic tool 110 may sign the manifest 502 using its private key 122. This may serve as a record who, when, what are intended modifications to the vehicle 102. In other examples, for OTA updates, the central gateway 112 may have received the manifest 502 from a cloud server, as opposed to the diagnostic tool 110. In such an example, the central gateway 112 may maintain the received manifest 502 as a record of the OTA update. In either approach, the manifest 502 may specific a running log of changes performed to the vehicle 102 by the diagnostic tool 110 and/or via OTA updates.

Figure 6:
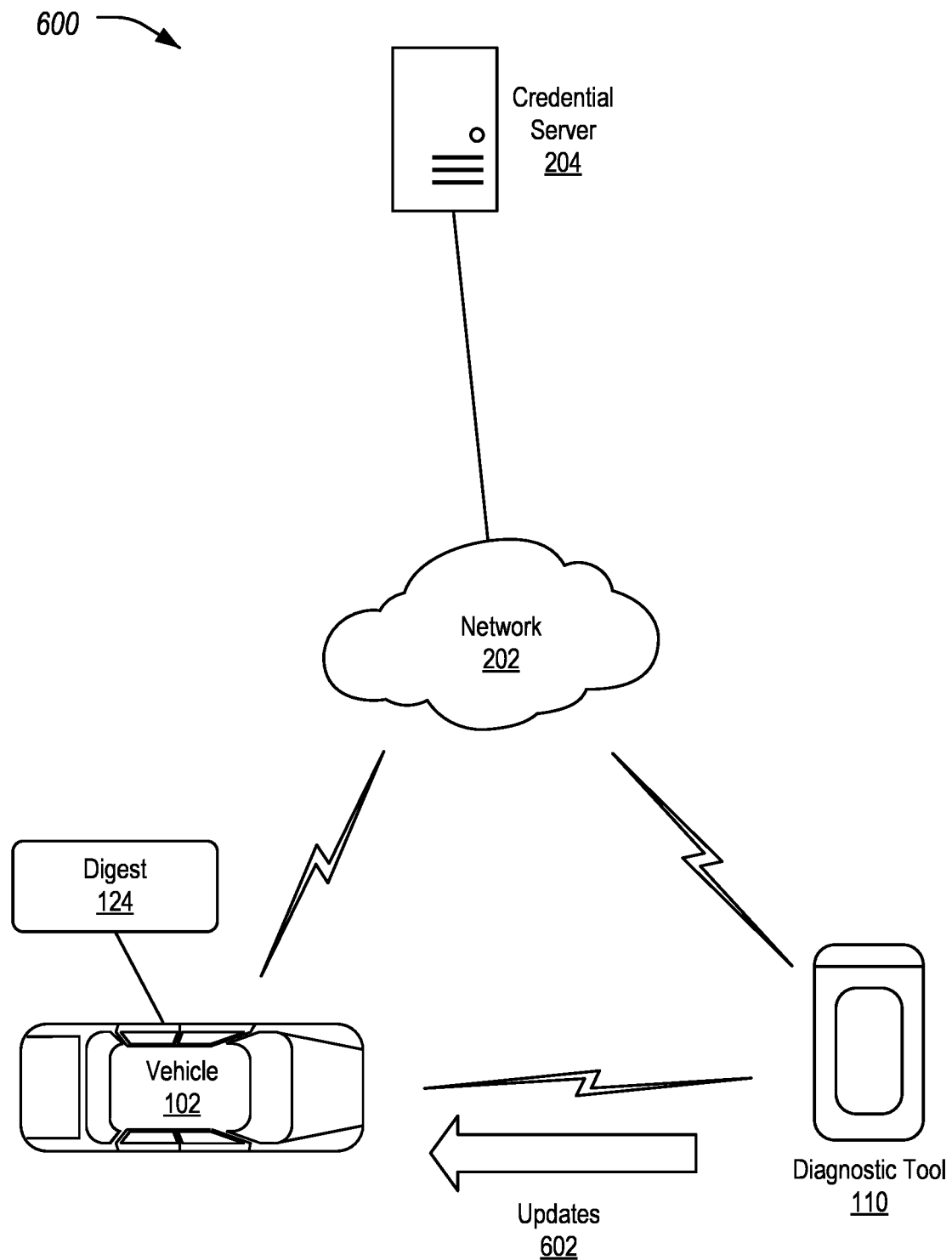
FIG. 6 illustrates an example of the diagnostic tool performing the diagnostic session to install the updates to the vehicle.

FIG. 6 illustrates an example of the diagnostic tool 110 performing the diagnostic session to install updates 602 to the vehicle 102. Thus, the central gateway 112 may provide vehicle 102 access to the diagnostic tool 110 based on certificate 306. The diagnostic session may also be scoped according to the manifest 502. For example, only changes that are specified by the manifest 502 may be approved by the central gateway 112 for installation to the ECUs 104. Additionally, the central gateway 112 may confirm the hash values of the updates 602 to be installed are correct as indicated in the manifest 502.

The central gateway 112 may generate the digest 124. For example, the central gateway 112 may store the first packets and/or frames of data cross the vehicle buses 106 for each modification-related communication. Modification-related communications may include one or more predefined service identifiers in their diagnostic communications. Thus, by monitoring for these IDs, modification-related communications may be identified. These identifiers may include for example, the WriteDataByIdentifier ($2E) service, the RequestDownload ($34) service, Unified diagnostic services (UDS, e.g., as defined by ISO 14229-1) Service IDs, etc. Responsive to completion of the changes specified by the manifest 502, the central gateway 112 may compile the digest 124 including both the manifest 502 and also the first packets and/or frames of each of the modifications. The central gateway 112 may sign this digest 124 and may include the current date/time in the signature. The signature may embed a one-way function (e.g., a hash) of the entire digest 124, to ensure that modifications to the digest 124 would be detectable. The digest 124 may be stored to the storage medium 118 of the central gateway 112 for archival purposes.

Responsive to completion of the installations, the update procedure may be considered complete, and the diagnostic session may end. The diagnostic tool 110 may be disconnected from the vehicle 102. The diagnostic tool 110 may also, in some examples, receive confirmation of the completion of the session.

For subsequent modifications to the vehicle 102, additional diagnostic sessions may be performed. These subsequent sessions may be performed as discussed herein. Additionally, for each subsequent session, the central gateway 112 may further include the digest 124 as part of the one-way hash function to calculate the current digest 124 signature. This may allow for the entire update path of the vehicle 102 to be maintained in non-reputable form for various purposes, such as for use in forensic accounting.

Figure 7:
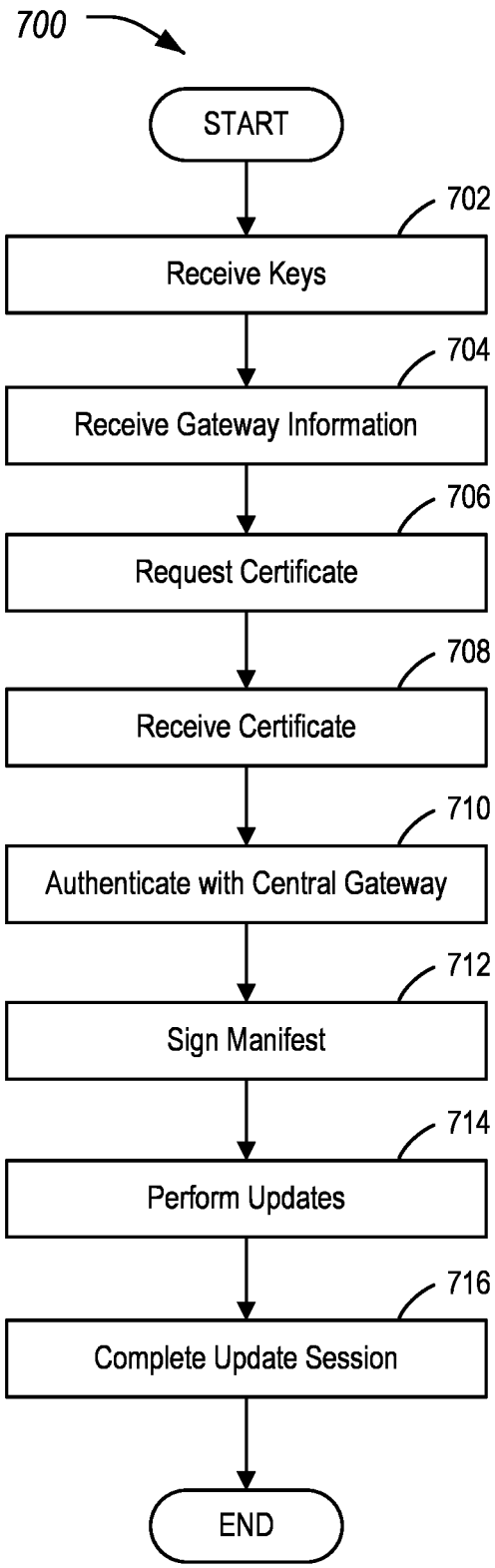
FIG. 7 illustrates an example process for utilizing the diagnostic tool for tracking a non-reputable vehicle change history.

FIG. 7 illustrates an example process 700 for utilizing the diagnostic tool 110 for tracking a non-reputable vehicle change history. In an example, the process 700 may be performed by the diagnostic tool 110 in the context of the system 100.

At operation 702, the diagnostic tool 110 receives keys 122 from the credential server 204. As shown with respect to FIG. 2, a credential server 204 may issue a key 122 to both the vehicle 102 and to the diagnostic tool 110. These keys 122 may include public and private key pairs for the diagnostic tool 110 and the central gateway 112 of the vehicle 102.

At operation 704, the diagnostic tool 110 receives gateway information 302. To initiate the update process, the diagnostic tool 110 may be connected to the vehicle 102 via the diagnostic port 108. As shown with respect to FIG. 3, the diagnostic tool 110 receives gateway information 302 via the diagnostic port 108, such as the serial number of the central gateway 112 of the vehicle 102. The diagnostic tool 110 may also identify itself according to an identify specified by its keys 122.

At operation 706, the diagnostic tool 110 sends a certificate signing request 304. As shown in FIG. 3, this certificate signing request 304 may be forwarded to the RA. The RA may forward the certificate signing request 304 to the PKI, which accordingly issues a certificate 306. At operation 708, the diagnostic tool 110 receives the certificate. For instance, this certificate 306 may then be provided from the credential server 204 back to the diagnostic tool 110.

At operation 710, the diagnostic tool 110 authenticates with the central gateway 112 of the vehicle 102. In an example, the central gateway 112 may request the diagnostic tool 110 to perform a cryptographic challenge, such as to sign data using the private key 122 of the diagnostic tool 110, which may be confirmed as authentic using the public key 122 of the diagnostic tool 110.

At operation 712, the diagnostic tool 110 signs a manifest 502. As shown in FIG. 5, the manifest 502 may include details of changes intended to be completed during the diagnostic session, including metadata of the updates and/or settings to be installed along with a hash of the updates and/or settings to be installed. The diagnostic tool 110 may sign the manifest 502, and send the manifest 502, as signed, to the central gateway 112 of the vehicle 102.

At operation 714, the diagnostic tool 110 installs the updates 602 to the vehicle 102. Thus, the changes that are specified by the manifest 502 may be provided for installation to the ECUs 104.

At operation 716, the diagnostic tool 110 completes the update session. In an example, the diagnostic tool 110 may be disconnected from the diagnostic port 108. In some examples, the diagnostic tool 110 may also receive a confirmation from the central gateway 112 that the update is completed. After operation 716, the process 700 ends.

Figure 8:
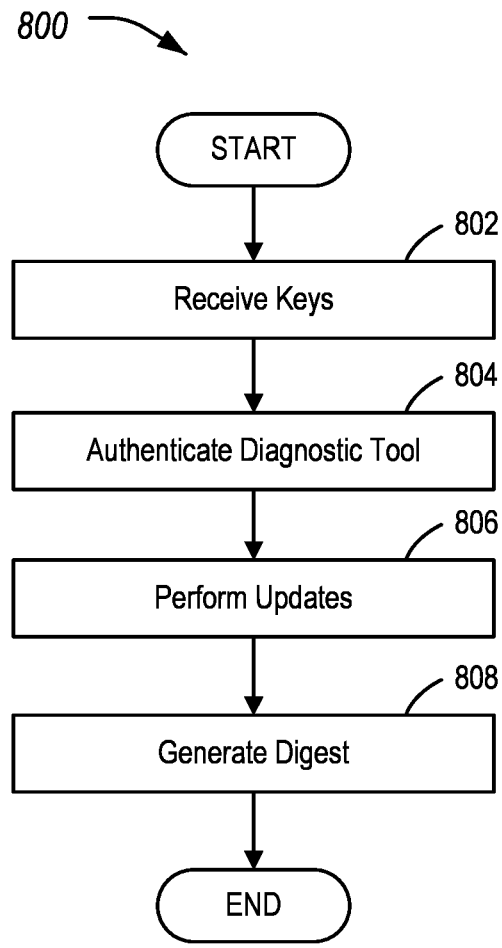
FIG. 8 illustrates an example process for the central gateway of the vehicle generating the non-reputable vehicle change history.

FIG. 8 illustrates an example process 800 for the central gateway 112 of the vehicle 102 generating the non-reputable vehicle change history. In an example, the process 800 may be performed by the central gateway 112 of the vehicle 102 in the context of the system 100.

At operation 802, and as discussed at operation 702, the central gateway 112 receives keys 122. As shown with respect to FIG. 2, these keys 122 may be received from the credential server 204.

At operation 804, and as discussed at operation 710, the central gateway 112 authenticates the diagnostic tool 110. For example, the central gateway 112 may challenge the diagnostic tool 110 to perform a cryptographic task (e.g., signing of information not known to the diagnostic tool 110 ahead of time) to make sure that the diagnostic tool 110 possess the private key 122 corresponding to the public identity of the diagnostic tool 110 indicates by the public key 122 of the diagnostic tool 110. The central gateway 112 may also verify that the signature on the manifest 502 corresponds to the identity of the diagnostic tool 110. For instance, the central gateway 112 may use the public key of the diagnostic tool 110 to ensure that the manifest 502 is signed by the diagnostic tool 110.

At operation 806, and as discussed at operation 714, the central gateway 112 performs installation of the updates 602. In an example, the central gateway 112 may receive the updates 602 from the diagnostic tool 110 and may validate that those updates are included on the manifest 502 for installation. The central gateway 112 may also verify correctness of checksums of the updates that are indicated in the manifest 502.

At operation 808, the central gateway 112 generates the digest 124. For example, responsive to completion of the changes specified by the manifest 502, the central gateway 112 may compile the digest 124 including both the manifest 502 and also the first packets and/or frames of each of the modifications. The central gateway 112 may sign this digest 124 and may include the current date/time in the signature. The signature may embed a one-way function (e.g., a hash) of the entire digest 124, to ensure that modifications to the digest 124 would be detectable. If this is not the first update session, the central gateway 112 may further include the digests 124 from previous sessions as part of the one-way hash function to calculate the current digest 124 signature. This may allow for the entire update path of the vehicle 102 to be maintained in non-reputable form for various purposes, such as for use in forensic accounting. After operation 808, the process 800 ends.

Figure 9:
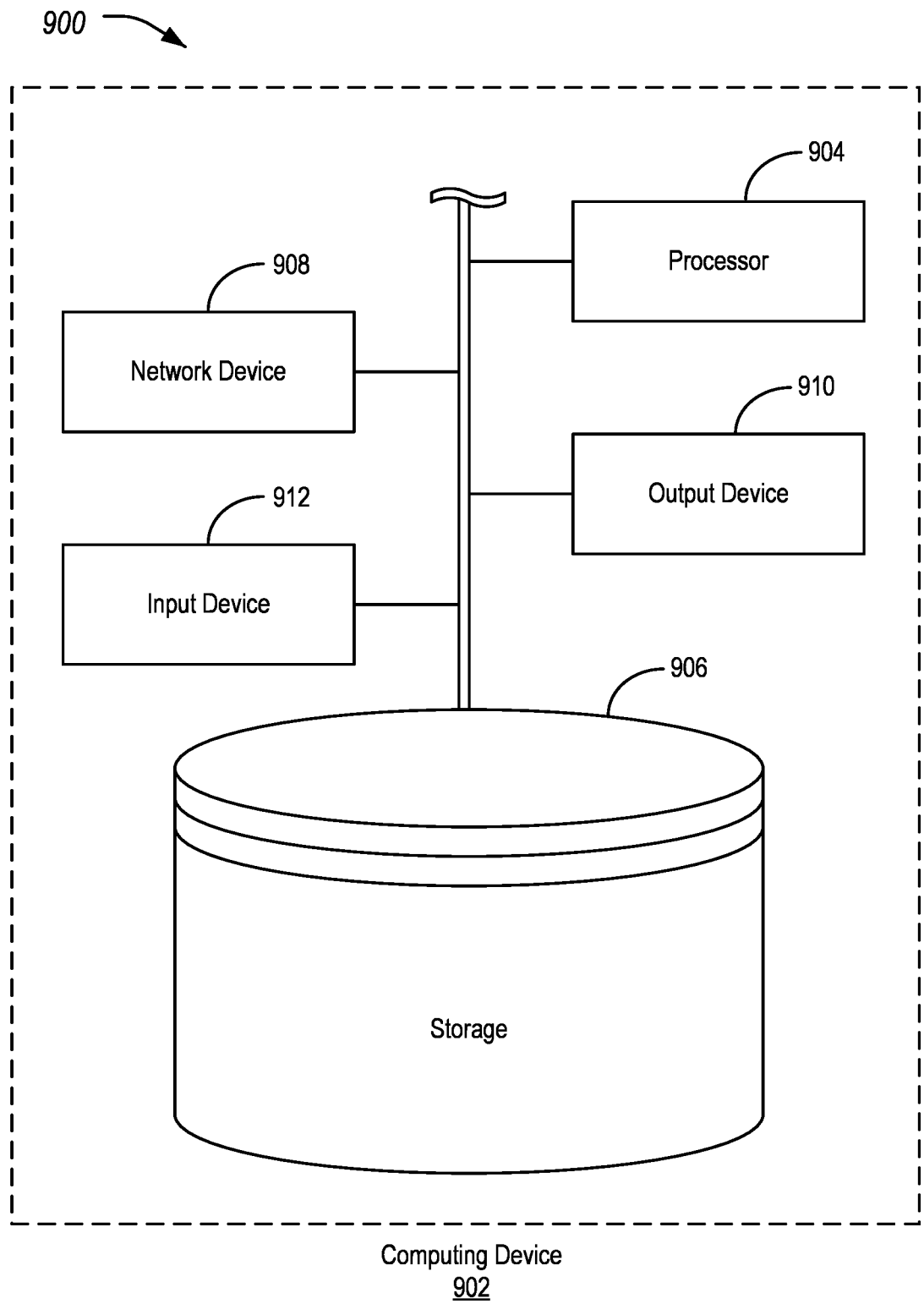
FIG. 9 illustrates an example computing device for tracking a non-reputable vehicle change history.

FIG. 9 illustrates an example computing device 902 for tracking a non-reputable vehicle change history. Referring to FIG. 9, and with reference to FIGS. 1-8, the vehicle 102, ECUs 104, diagnostic tool 110, and central gateway 112 may include examples of such computing devices 902. Computing devices 902 generally include computer-executable instructions, such as those of the applications 120, where the instructions may be executable by one or more computing devices 902. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the keys 122, the digests 124, gateway information 302, certificate signing requests 304, certificates 306, manifests 502, and updates 602, may be stored and transmitted using a variety of computer-readable media.

As shown, the computing device 902 may include a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic RAM that stores program instructions and data during operation of the system 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display. As another example, the output device 910 may include an audio device, such as a loudspeaker or headphone. As yet a further example, the output device 910 may include a tactile device, such as a mechanically raiseable device that may, in an example, be configured to display braille or another physical output that may be touched to provide information to a user.

The input device 912 may include any of various devices that enable the computing device 902 to receive control input from users. Examples of suitable input devices 912 that receive human interface inputs may include keyboards, mice, trackballs, touchscreens, microphones, graphics tablets, and the like.

The network devices 908 may each include any of various devices that enable the described components to send and/or receive data from external devices over networks. Examples of suitable network devices 908 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for tracking component configuration, comprising:
   electronic control units (ECUs); and
   a central gateway, including a hardware processor and a non-transitory storage, wherein the central gateway in communication with the ECUs over one or more vehicle buses and is programmed to utilize the hardware processor to:
   generate a first digest of first software updates installed to the ECUs, the first digest including a manifest of changes performed to the ECUs and a first hash of a subset of the first software updates,
   embed a signature of the central gateway into the first digest, the signature including a first digest hash of the first digest, and
   maintain the first digest to the non-transitory storage as a non-reputable record of installation of the software updates to the ECUs.

2. The system of claim 1, wherein the central gateway is further programmed to:
   generate a second digest of second software updates installed to the ECUs, the second digest including a second manifest of changes performed to the ECUs, a second hash of a subset of the second software updates, and the first digest hash;
   embed a second signature of the central gateway into the second digest, the second signature including a second digest hash of the second digest; and
   maintain the second digest to the non-transitory storage as a non-reputable record of installation of the first software updates and the second software updates to the ECUs.

3. The system of claim 1, wherein the first software updates are received to the central gateway from a diagnostic tool, and the manifest is signed by a private key of the diagnostic tool.

4. The system of claim 3, wherein the central gateway is further programmed to verify an identity of the diagnostic tool using a public key of the diagnostic tool, the public key corresponding to the private key used to sign the manifest.

5. The system of claim 1, wherein the subset of the first software updates includes first packets and/or frames of each of the first software updates.

6. The system of claim 5, wherein the central gateway is further programmed to identify the first packets and/or frames by monitoring for predefined service identifiers indicative of modification-related communications.

7. The system of claim 1, wherein the first software updates include updated settings to be applied to one or more of the ECUs and/or updated software to be installed to the one or more of the ECUs.

8. A method for tracking component configuration, comprising:
   generating, by a central gateway in communication with ECUs over one or more vehicle buses, a first digest of first software updates installed to the ECUs, the first digest including a manifest of changes performed to the ECUs and a first hash of a subset of the first software updates;
   embedding, by the central gateway, a signature of the central gateway into the first digest, the signature including a first digest hash of the first digest; and
   maintaining the first digest to a non-transitory storage of the central gateway as a non-reputable record of installation of the software updates to the ECUs.

9. The method of claim 8, wherein the central gateway is further programmed to:
   generating, by the central gateway, a second digest of second software updates installed to the ECUs, the second digest including a second manifest of changes performed to the ECUs, a second hash of a subset of the second software updates, and the first digest hash;
   embedding, by the central gateway, a second signature of the central gateway into the second digest, the second signature including a second digest hash of the second digest; and
   maintaining the second digest to the non-transitory storage of the central gateway as a non-reputable record of installation of the first software updates and the second software updates to the ECUs.

10. The method of claim 8, further comprising receiving the first software updates to the central gateway from a diagnostic tool, the manifest being signed by a private key of the diagnostic tool.

11. The method of claim 10, further comprising verifying an identity of the diagnostic tool using a public key of the diagnostic tool, the public key corresponding to the private key used to sign the manifest.

12. The method of claim 8, wherein the subset of the first software updates includes first packets and/or frames of each of the first software updates.

13. The method of claim 12, further comprising identifying the first packets and/or frames by monitoring for predefined service identifiers indicative of modification-related communications.

14. The method of claim 8, wherein the first software updates include updated settings to be applied to one or more of the ECUs and/or updated software to be installed to the one or more of the ECUs.

15. A non-transitory computer-readable medium comprising instructions tracking component configuration that, when executed by one or more processors of a central gateway in communication with ECUs over one or more vehicle buses, cause the central gateway to perform operations including to:
   generate a first digest of first software updates installed to the ECUs, the first digest including a manifest of changes performed to the ECUs and a first hash of a subset of the first software updates,
   embed a signature of the central gateway into the first digest, the signature including a first digest hash of the first digest, and
   maintain the first digest to a non-transitory storage of the central gateway as a non-reputable record of installation of the software updates to the ECUs.

16. The medium of claim 15, further comprising instructions that, when executed by the one or more processors of the central gateway, cause the central gateway to perform operations including to:
   generate a second digest of second software updates installed to the ECUs, the second digest including a second manifest of changes performed to the ECUs, a second hash of a subset of the second software updates, and the first digest hash;
   embed a second signature of the central gateway into the second digest, the second signature including a second digest hash of the second digest; and
   maintain the second digest to the non-transitory storage as a non-reputable record of installation of the first software updates and the second software updates to the ECUs.

17. The medium of claim 15, wherein the first software updates are received to the central gateway from a diagnostic tool, and the manifest is signed by a private key of the diagnostic tool.

18. The medium of claim 17, further comprising instructions that, when executed by the one or more processors of the central gateway, cause the central gateway to perform operations including to verify an identity of the diagnostic tool using a public key of the diagnostic tool, the public key corresponding to the private key used to sign the manifest.

19. The medium of claim 15, wherein the subset of the first software updates includes first packets and/or frames of each of the first software updates, and further comprising instructions that, when executed by the one or more processors of the central gateway, cause the central gateway to perform operations including to identify the first packets and/or frames by monitoring for predefined service identifiers indicative of modification-related communications.

20. The medium of claim 15, wherein the first software updates include updated settings to be applied to one or more of the ECUs and/or updated software to be installed to the one or more of the ECUs.

\* \* \* \* \*